Feb. 23, 1960  J. E. S. LAPORTE  2,925,873
SNOW VEHICLE
Filed Dec. 2, 1954  5 Sheets-Sheet 1
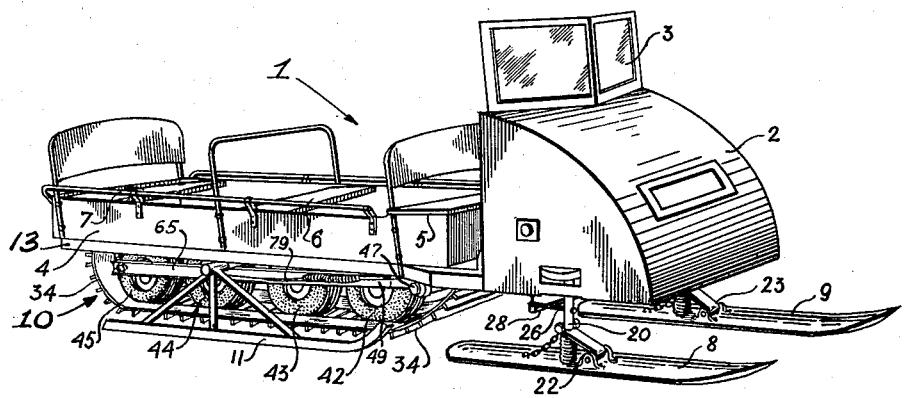
Fig-1
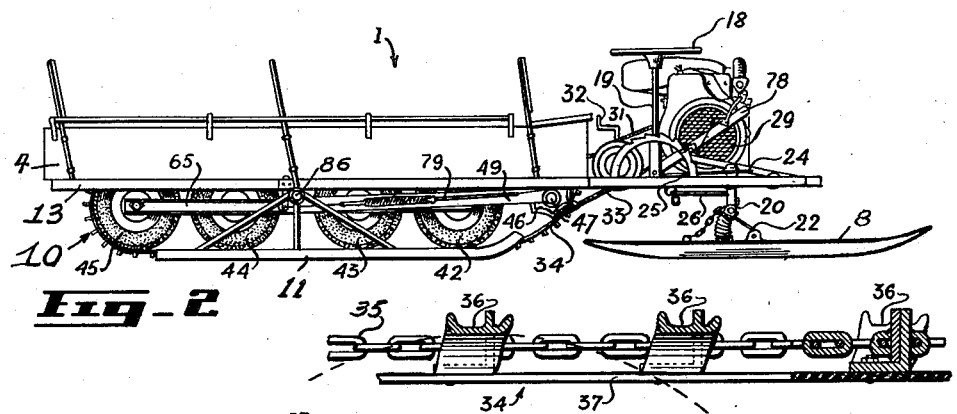
Fig-2
Fig-8
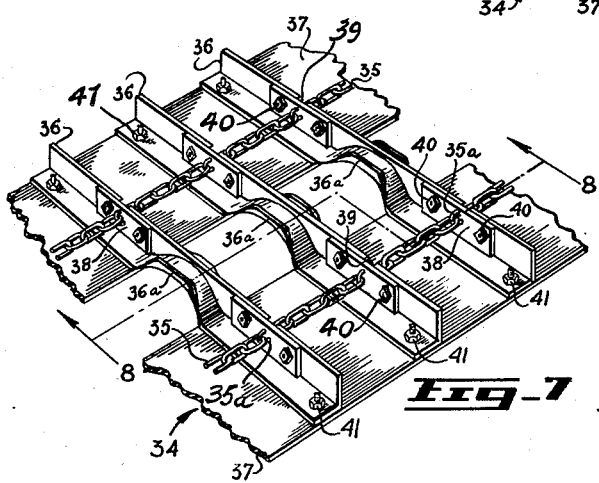
Fig-7
INVENTOR
JOSEPH E. S. LAPORTE
By W. R. Meredith
ATTORNEY

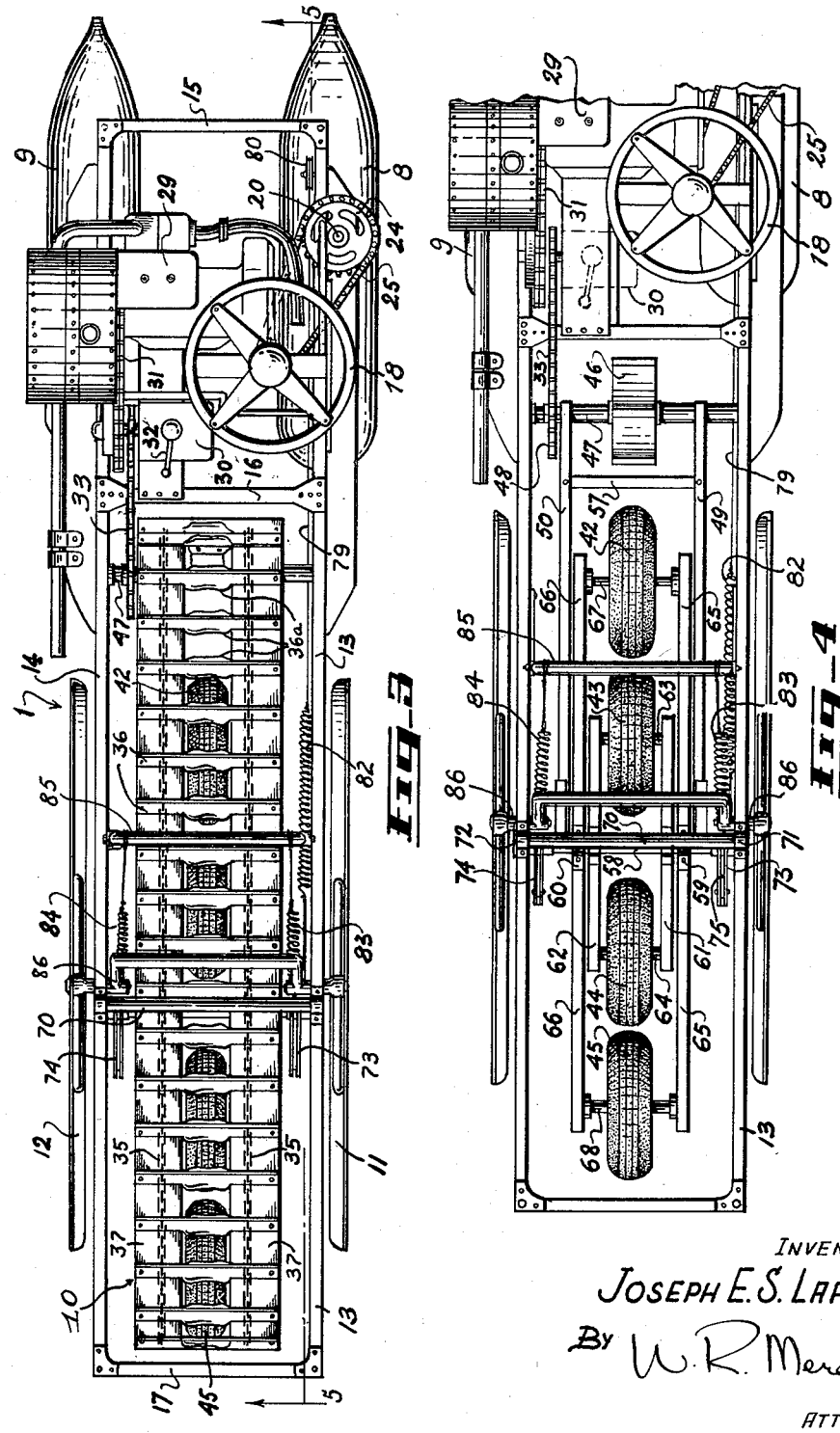

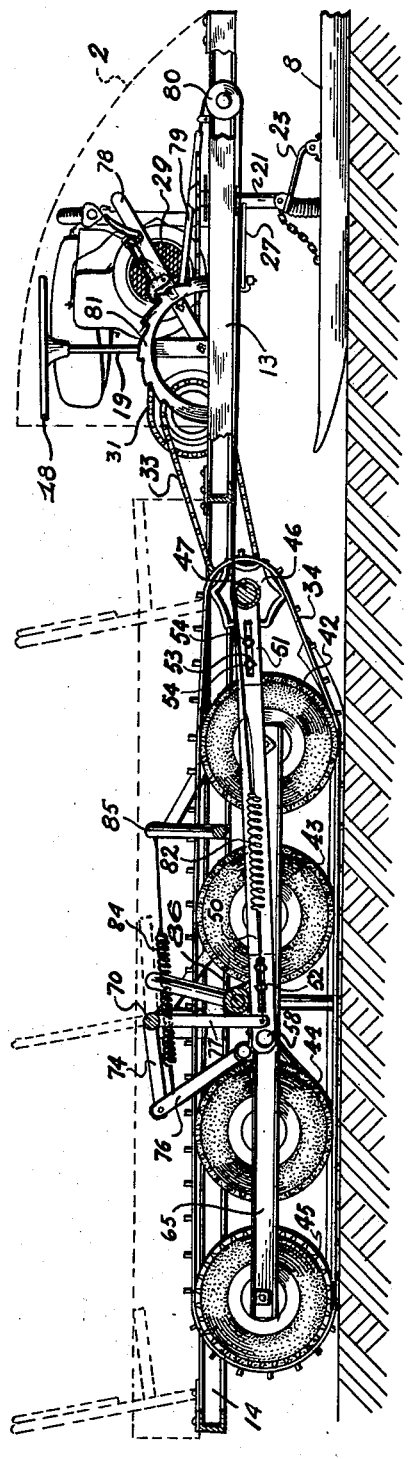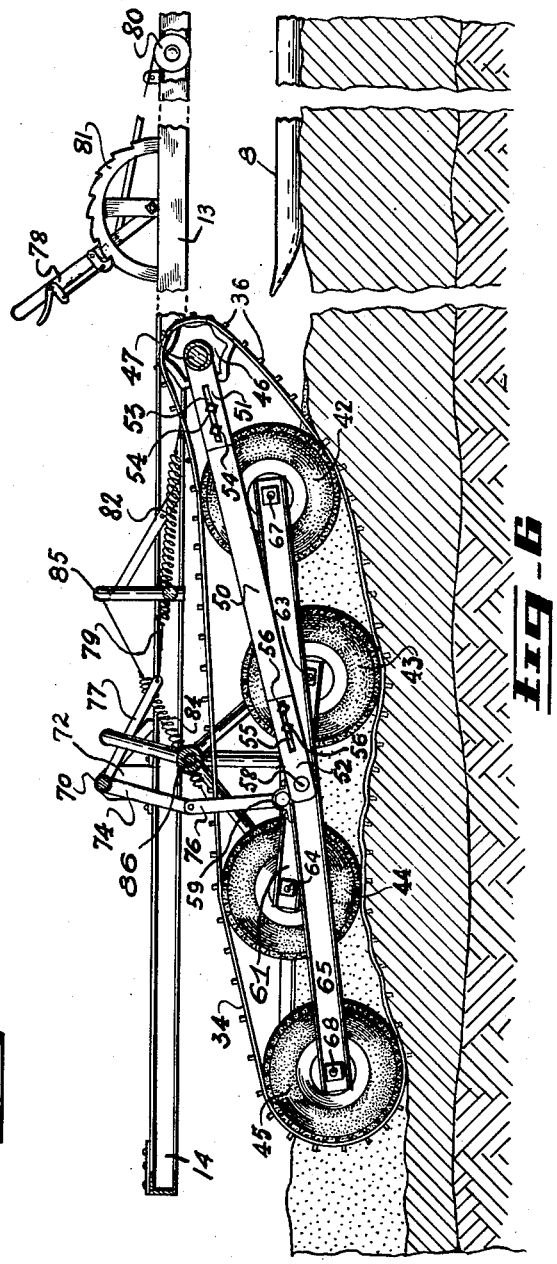

Feb. 23, 1960    J. E. S. LAPORTE    2,925,873
SNOW VEHICLE
Filed Dec. 2, 1954    5 Sheets-Sheet 4
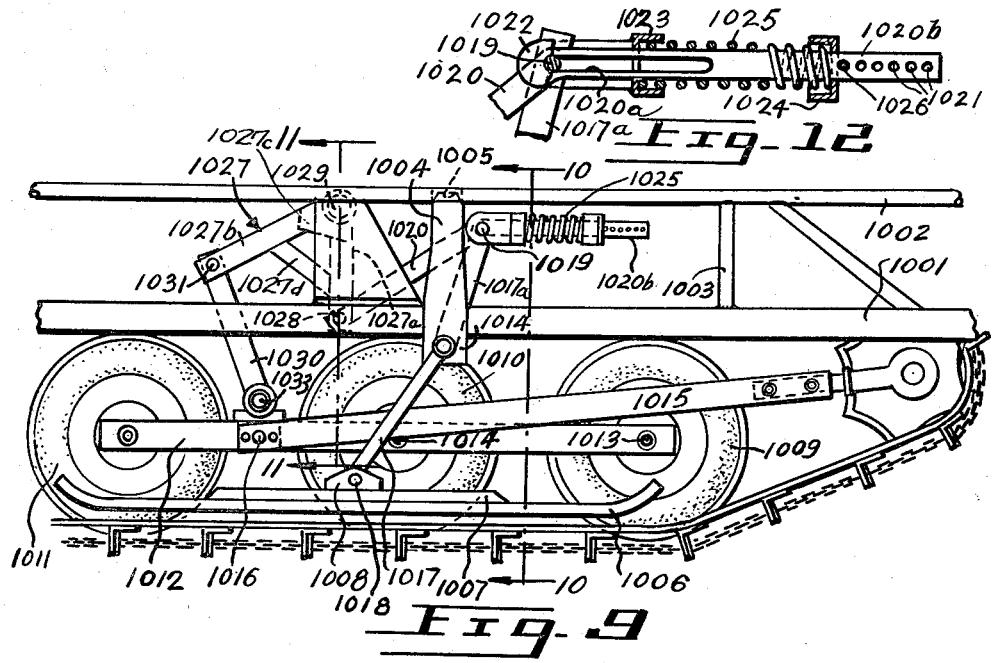
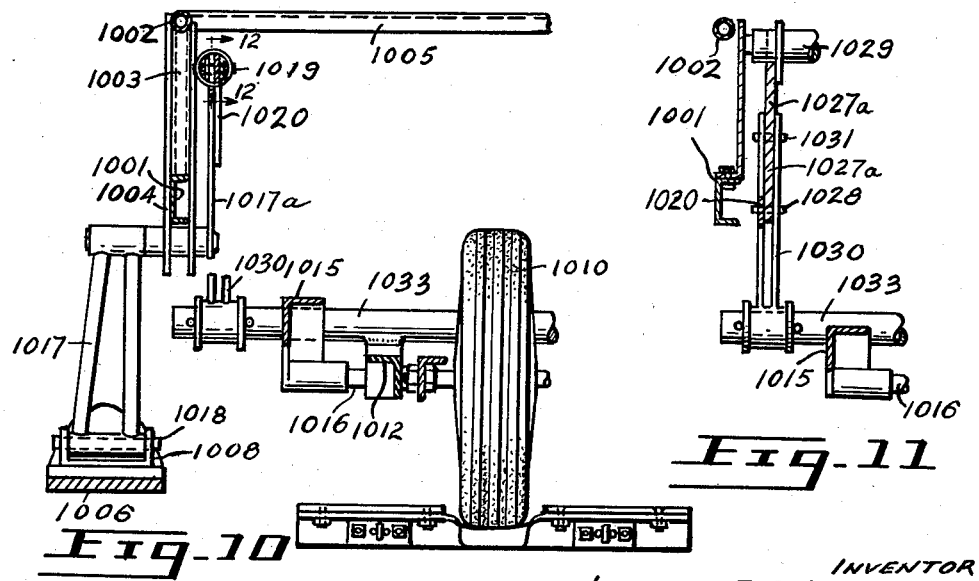
INVENTOR
JOSEPH E. S. LAPORTE
BY W. R. Meredith
ATTORNEY Feb. 23, 1960　　　　J. E. S. LAPORTE　　　2,925,873
SNOW VEHICLE Filed Dec. 2, 1954　　　　　　　　　　　　　5 Sheets-Sheet 5

INVENTOR
JOSEPH E. S. LAPORTE
BY W. R. Meredith
ATTORNEY

United States Patent Office 2,925,873
Patented Feb. 23, 1960

2,925,873

SNOW VEHICLE

Joseph Edward Sam Laporte, Arntfield, Quebec, Canada

Application December 2, 1954, Serial No. 472,705

4 Claims. (Cl. 180—5)

This invention relates to a vehicle of the type provided with an endless tread and skis particularly intended for running on snow and ice, but also capable of movement over other surfaces such as rough ground.

A number of vehicles of this general type have been used in the past, but these have been, in general, somewhat unsatisfactory. One of the important disadvantages of such prior vehicles is that the tread construction has been such that the endless tread tends to dig itself into the running surface such as snow to such an extent that parts of the body of the vehicle come to rest on the running surface thereby immobilizing the vehicle.

It is an object of the present invention to overcome the disadvantages of prior vehicles of this type and provide an improved vehicle which does not become immobilized by reason of the tread digging into the surface as aforesaid.

It is a further object to provide such a vehicle which has improved control of the tread, including the pressure of the tread on the running surface.

An accompanying object to the foregoing is the provision of improved steering characteristics and better weight distribution.

It is also an object to provide such a vehicle which is easier to construct and maintain than previous vehicles for the same purpose.

The invention will now be described with reference to the accompanying drawings wherein a preferred embodiment is shown. It will be realized that various changes could be made in the embodiment shown and described, and other apparently different embodiments of the invention could be constructed without departing from the scope thereof. Accordingly it is intended that all matter shown in the accompanying drawings or described herein shall be interpreted as illustrative and not in a limiting sense. In the drawings, wherein identical reference numerals denote like parts throughout, Figure 1 shows a general oblique three-quarters view of a preferred embodiment of the present invention;

Figure 2 shows a side elevation view similar to Figure 1, but with the cover of the front portion removed;

Figure 3 shows a top plan view corresponding to Figure 2;

Figure 4 shows a fragmentary top plan view similar to the left-hand side of Figure 3, with the tread, denoted by reference numeral 34 removed;

Figure 5 shows a partly cross-sectioned side view of the device illustrated in the foregoing figures, cross-sectioned along the line 5—5 in Figure 3;

Figure 6 shows a partly cross-sectioned side view generally similar to Figure 5, illustrating the manner in which the device illustrated in the foregoing figures passes over a rough running surface;

Figure 7 shows a fragmentary oblique view of a portion of the track denoted by reference numeral 34 to be described below;

Figure 8 shows a fragmentary cross-sectional view as seen along the line 8—8 in Figure 7;

Figure 9 shows alternative construction of the rear right-hand part of a vehicle according to the present invention wherein there is mechanical relationship between the position of the tread and the position of the skis;

Figure 10 shows a fragmentary cross-sectional view along the line 10—10 in Figure 9;

Figure 11 shows a fragmentary cross-sectional view along the line 11—11 in Figure 9;

Figure 12 is a partly cross-sectional view taken substantially on the line 12—12 of Figure 10, illustrating one construction of a preferred shock-absorbing means;

Figure 13:
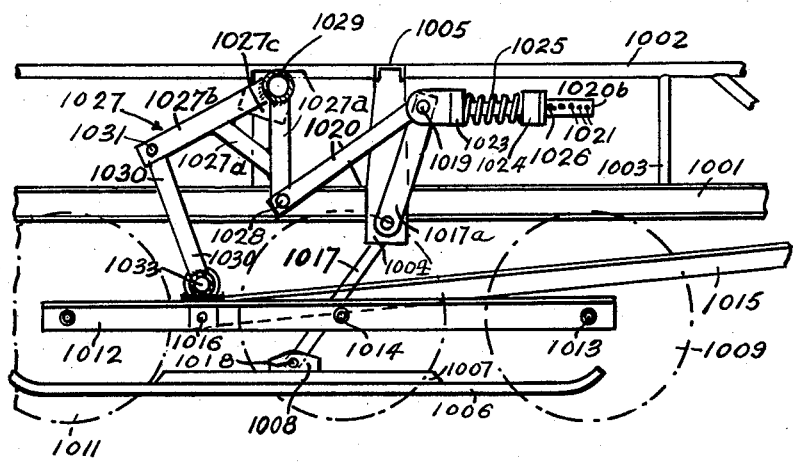
Figure 13 shows a view similar to that of Figure 9 of the rear left-hand portion of the vehicle as seen from inside the vehicle illustrated in Figure 9; and, Figures 14 and 15 are diagrammatic views illustrating the mechanical function of the tread and the skis in the embodiment of the invention illustrated in Figures 9–13.

Referring to the drawings, a preferred form of the vehicle is shown generally at 1. Vehicle 1 has as its principal external feature a front hood denoted by 2, a windshield denoted by 3, a rear portion denoted by 4 upon which are mounted seats denoted by 5, 6 and 7; skis denoted by 8 and 9 and a tread assembly denoted by 10 supporting the vehicle 1 on the running surface.

In addition to skis 8 and 9 and tread assembly 10 runners denoted by 11 and 12 are also provided, the construction and purpose of which will be described below.

As in the case of most vehicles, vehicle 1 has a chassis, and the principal chassis members in the present embodiment are longitudinal supporting members denoted by 13 and 14 and cross supporting members denoted by 15, 16 and 17. Members 13–17 preferably consist of channel sections of a light metal alloy firmly fastened together so as to produce a rigid chassis.

A steering wheel denoted by 18 mounted on a steering wheel shaft denoted by 19 is used to control the direction of the vehicle. Steering shaft 19 is suitably mounted in a bearing attached to the chassis and is provided with a sprocket wheel rigidly attached thereto. Both the said bearing and the said sprocket wheel are of obvious construction and are not shown.

Skis 8 and 9 are provided with shafts 20 and 21 respectively and the said skiis are mounted rigidly thereon so far as rotation in a horizontal plane is concerned. However, it is desirable that skis 8 and 9 shall be capable of a small amount of rotation in a vertical plane, in the manner of aircraft skis, and for this purpose flexible joints denoted by 22 and 23 respectively, are provided to connect shafts 20 and 21 to skis 8 and 9.

The shafts 20 and 21 are suitably mounted in bearings (not shown but of obvious construction) attached to the chassis. Shaft 20 has rigidly attached thereto a sprocket wheel denoted by 24, and a flexible chain denoted by 25 rotatably connects the sprocket wheel (not shown) attached to steering shaft 19, and sprocket wheel 24. Shafts 20 and 21 have rigidly attached thereto steering arms denoted by 26 and 27 respectively, and a suitable tie-bar, denoted by 28 is pivotally attached to steering arms 26 and 27, and rotatably links the shafts 20 and 21.

It will be apparent that when steering wheel 18 is rotated the steering shaft 19 will also rotate, as well as the sprocket wheel 24. Rotation of sprocket wheel 24 causes ski 8 to turn directly and such rotation also causes ski 9 to turn so as to remain parallel to ski 8 by virtue of steering arms 26 and 27, and the tie-bar 28.

The motor suitably mounted on the chassis is denoted by 29, and is preferably air-cooled in the interest of lightness and economy but the invention is in no way limited to such kind of motor.

The power output of motor 29 is delivered to a power transmission, denoted by 30 by means of a drive chain denoted by 31. Power transmission 30, suitably mounted on the chassis may be of any convenient construction but should have at least three forward speeds. The gear shaft lever for power transmission 30 is shown at 32.

The power output of power transmission 30 is delivered by means of a suitable drive chain denoted by 33 and is adapted to drive the tread of tread assembly 10 in a manner to be described below.

The tread assembly 10 will now be referred to. The tread denoted by 34 consists of a plurality of endless chains denoted by 35, a plurality of angles denoted by 36 attached at right-angles to chains 35 and an endless strip of flexible material such as rubber belting denoted by 37.

Angles 36 are attached to chains 35 by means of short bars denoted by 38. Each of bars 38 has a chain link denoted by 35a integral therewith of substantially the same size as the links of chain 35, and chain 35 is attached in sections between such links. Angles 36 have suitable recesses, denoted by 39, adapted to receive links 35a. Bars 38 are attached to angles 36 by any suitable fastening means such as bolts 40. Angles 36 are attached to the endless strips of flexible material 37 by means of suitable fastening means such as bolts 41.

It will be seen that the endless strips of flexible material 37 have a space therebetween, and where angles 36 cross such space, they are bent so as to have rounded contours as shown, the bent portions being denoted by 36a.

It is contemplated that tread 34 will run around a plurality of bogey wheels denoted by 42, 43, 44 and 45 and a drive sprocket wheel denoted by 46. The present invention is in no way limited to any particular number of bogey wheels but four bogey wheels have been found suitable.

Drive sprocket wheel 46 is preferably of the fluted shape shown, the peripheral distance between the flutes corresponding to the distance between successive angles 36 of the tread 34, so that there will be a suitable mesh. Drive sprocket wheel is rigidly attached to a shaft denoted by 47 carried in suitable bearings at each of its ends on the chassis of the vehicle. A drive chain type of sprocket wheel denoted by 48 is also rigidly attached to shaft 47, and it is contemplated that drive chain 33 previously described will mesh with sprocket wheel 48.

It will be seen that the driving of tread 34 will take place as follows: power is delivered from motor 29 through power transmission 30 by drive chain 33 to sprocket wheel 48 and thence to the tread 34 by means of drive sprocket wheel 46.

The mounting of bogey wheels 42-45 will now be described. Pivotally attached to shaft 47 are longitudinal tread bars denoted by 49 and 50. It is desirable that it be possible to adjust the length of tread bars 49 and 50 to overcome manufacturing variations and the like. The adjustable features of the tread bars 49 and 50 are similar, and only the latter will be described. Referring particularly to Figures 5 and 6, tread bar 50 has at each end thereof an extensible portion denoted by 51 and 52. Extensible portion 51, adapted to make pivotal attachment with shaft 47 has a longitudinal slot on either side thereof, denoted by 53. Bolts denoted by 54 are adapted to pass through suitable holes in tread bar 50 and slots 53, so that the relative longitudinal position of tread bar 50 and the extensible portion 51 may be adjustably fixed. A similar arrangement is provided at the opposite end of tread bar 50 by means of extensible portion 52 having slots 55 therein, and bolts 56.

The tread bars 49 and 50 are connected by cross bar 57 to promote rigidity and at the end of tread bars 49 and 50 opposite shaft 47, tread bars 49 and 50 are rigidly connected by means of a shaft denoted by 58.

Pivotally mounted on shaft 58 is a further pair of tread bars denoted by 61 and 62. The forward ends of tread bars 61 and 62 are rigidly connected by a shaft denoted by 63 upon which bogey wheel 43 is rotatably mounted. At the opposite end of tread bars 61 and 62, a shaft similar to shaft 63, denoted as 64 is also provided, upon which bogey wheel 44 is rotatably mounted. It will be thus apparent that bogey wheels 43 and 44 are capable of vertical motion of two kinds, first a general pivotal motion about shaft 47, and a further pivotal motion about shaft 58. Such flexibility of motion is of assistance in providing that the tread assembly shall be capable of following uneven contours of the running surface.

Also rotatably attached to shaft 58 outwardly of tread bars 61 and 62 are tread bars 65 and 66, and bogey wheels 42 and 45 are rotatably mounted on shafts 67 and 68 in a manner similar to the mounting of bogey wheels 43 and 44 between tread bars 61 and 62. As is the case of bogey wheels 43 and 44, bogey wheels 42 and 45 are also capable of two kinds of vertical motion, firstly a general pivotal motion about shaft 47 and a second pivotal motion about shaft 58. In the result, all the bogey wheels 42–45, and hence the tread 34 are capable of following rugged surface contours.

It is contemplated that the motion of tread bars 49, 50, 61, 62, 65 and 66 about shaft 47 will be capable of adjustment so that the tread assembly 10 may be applied to the running surface at a suitable angle to properly propel the vehicle, having regard to varying load and surface conditions.

In the present form of the invention this is carried out by rotating the tread bars 49 and 50 about shaft 47 to different positions as may be required, thus causing the tread assembly 10 to be disposed at different angular positions with respect to longitudinal supporting members 13 and 14. A comparison of two such angular positions may be seen by an examination of Figures 5 and 6.

In order to carry out such variable positioning there is provided a mechanism, which in the form shown consists of a swivel shaft denoted by 70 rotatably mounted on brackets denoted by 71 and 72 which brackets are in turn attached to longitudinal supporting members 13 and 14, respectively; swivel arm denoted by 73 and 74 welded or otherwise fixedly attached to swivel shaft 70; bars denoted by 75 and 76, each pivotally attached at their upper ends to swivel arms 73 and 74, respectively, and pivotally attached at their lower ends to tread bars 65 and 66 at brackets 59 and 60 respectively; an adjusting arm denoted by 77 rigidly attached to swivel shaft 70; an adjusting lever denoted by 78 pivotally attached to longitudinal supporting member 13 and a cable denoted by 79 connecting adjusting lever 78 to adjusting arm 77, passing round a pulley denoted by 80. Adjusting lever 78 has a conventional notched positioning plate denoted by 81 and other conventional means for locking the adjusting lever 78 temporarily in different angular positions.

A shock absorbing means which also functions to resiliently press the tread assembly 10 downwardly at all times comprises a spring 82 which may conveniently be interposed in the cable 79.

A shock-absorbing means making use of springs denoted by 83 and 84 is also preferably provided. Springs 83 and 84 are anchored at a transverse bar denoted by 85 which is fixedly supported between chassis members 13 and 14 and the opposite ends of springs 83 and 84 are attached to bars 75 and 76. The shock-absorbing action of the parts just described will be apparent: if the tread assembly 10 receives a shock, as by striking an obstacle, it will be driven upwardly causing bars 75 and 76 to rotate in a counterclockwise direction when the vehicle is positioned as shown in Figures 1, 2, 5 and 6. Such motion of bars 75 and 76 tends to lengthen springs 83 and 84, and this is resisted by the tension of the spring thus damping oscillations of track assembly 10 about shaft 47.

The runners 11 and 12 will now be described. The said runners are pivotally mounted on each end of the shaft 86 by means of cotters or other removable holding device. Shaft 86 is rigidly attached to the vehicle, and in addition to holding runners 11 and 12, the said shaft provides additional cross-bracing for the vehicle. It should be understood that runners 11 and 12 are not essential to the realization of the advantages of the present invention, but if the vehicle 1 is to be run on a hard surface such as a plowed highway or a frozen lake, the extreme traction provided by tread assembly 10 will not be required and it is preferable to lessen the load on the tread assembly. When the vehicle is used in deep snow, it is preferable that the runners 10 be removed so that the tread assembly 10 can sink into the snow adequately and obtain the degree of traction which is inherent in an embodiment of the present invention.

The function of various parts relative to one another have been described above, and need not be elaborated on further. Attention may however be called again to Figures 5 and 6 which show the ease with which the present vehicle follows uneven contours and maintains traction regardless of the depth of snow or other material.

It will be seen that the present device has a large number of superior features over those found in prior vehicles of this general type, and on account of its simple construction, it is easy to build, operate and maintain.

While the embodiment already described is satisfactory for most conditions, it has been found that where a wide range of snow depth and hardness is encountered and extensive drifts must be negotiated, that the embodiment about to be described will result in improved operation.

Reference will now be made to Figures 9–13, where there is shown a detailed view of the mechanism which provides improved operation under difficult conditions, and the parts of the machine not important for this purpose are omitted.

The mechanism about to be described will work equally well either where the wheels of the track are mounted on independent suspensions, in turn mounted on a common frame as previously disclosed, or where the wheels of the track are merely mounted directly on a frame. Accordingly, for simplicity in disclosing the mechanism the invention will be described in relation to the latter simpler construction.

In Figures 9–12 a principal member of the chassis of the vehicle is shown at 1001, which may be a channel member. An upper auxiliary member, which may be tubular, is shown at 1002 with a small vertical portion connecting it with the channel as shown at 1003.

Members 1001 and 1002 are joined by an additional rigid member denoted by 1004, which member plays a part in the function of the mechanism about to be described. An auxiliary transverse member denoted by 1005, not important in connection with the present description, connects member 1002 to a like member on the opposite side of the chassis.

It is only necessary to describe the mechanism in detail in connection with one side of the chassis, it being understood that parts having an opposite-hand relationship to those about to be described will be provided on the opposite side. Accordingly, only the rear left-hand portion of the vehicle is described in detail and the construction at the rear right-hand side will be apparent with reference to Figure 13.

A ski denoted by side ski 1006 (to distinguish from the skis already referred to) is provided having a reinforcing member denoted by 1007. A lug denoted by 1008 is attached to side ski 1006 and reinforcing member 1007.

The track, as in the form of the invention previously described consists of a plurality of wheels having a tread disposed therearound driven by a suitable sprocket means as mentioned above, the wheels being shown at 1009–1011 respectively. Wheels 1009–1011 are rigidly supported on longitudinal members 1012 in a conventional manner by axles such as are denoted by 1013 and 1014. A pair of tread bars, one of which is denoted by 1015 is pivotally supported at the forward end of the machine, i.e. at the right-hand side of Figures 9–13, as in the embodiment previously described. Longitudinal member 1012 is pivotally supported by tread bar 1015 by means of a suitable axle denoted by 1016, which is again quite conventional.

Referring now to the support of side ski 1006, a crank denoted by 1017 is pivotally attached at 1018 to lug 1008 and passes through a suitable bearing in member 1004 (rigidly attached to the chassis of the vehicle). It will be understood that in order to avoid longitudinal twisting of side ski 1006, crank 1017 will preferably have a double member arm at the point of attachment to lug 1008, but this is merely a matter of design which would be apparent to one skilled in the art.

The opposite side of crank 1017, denoted by 1017a has a pin passing therethrough denoted by 1019, by means of which connection is made to a crank bar denoted by 1020. From a strict mechanical standpoint, all that is necessary between crank arm 1017a and crank bar 1020 is a pivotal connection, but it has been found that it is desirable to provide shock absorbing means so that jolts imparted to the side ski 1006 and the track do not damage the mechanism. To this end, certain features on the right-hand side of crank arm 1017a as seen in Figures 9 and 13 will now be described, but it will be appreciated that these are not essential to the functioning of the mechanism and many other forms of shock absorbing means could be provided, either at the position indicated or at some other position in the mechanism, as will be apparent. Crank bar 1020 has a discreet change of angle as shown with a projection terminated by a tip denoted by 1020b. Crank bar 1020 is provided with a longitudinal slot denoted by 1020a and tip 1020b has a plurality of holes at intervals therethrough denoted by 1021.

A pair of reinforcing plates denoted by 1022 is provided in front of crank arm 1017a and behind crank bar 1020. In Figure 12 the most forwardly-positioned plate 1022 is cut away to disclose the construction of the parts thereunder.

Adjacent reinforcing plates 1022 and surrounding the portion 1020a of crank bar 1020 is a spring retaining cup denoted by 1023 and a similar spring retaining cup denoted by 1024 is provided at region 1020b. Between spring retaining cups 1023 and 1024 is a helical spring denoted by 1025. Spring 1025 is suitably compressed, and a retaining pin denoted by 1026 is provided in one of the holes 1021. It is apparent that the compression of spring 1025 is adjustable to accommodate for the type of shocks encountered, and to compensate for loss of resiliency of the spring 1025 with the passage of time.

Crank bar 1020 is pivotally attached to an A-shaped member denoted by 1027, the pivotal connection being made by means of pin 1028. A-shaped member 1027 is pivotally attached to the frame of the vehicle by means of a suitable bearing denoted by 1029 which may be provided with a shaft connecting both sides of the vehicle and pivotally supporting the counterpart of A-shaped member 1027 on the other side of the vehicle.

It will be thus apparent that the structure including the crank 1017, and crank bar 1020 constitutes a mechanical linkage interconnecting the member 1027 to the ski means for causing vertical movement of the ski means, incident to angular movement of the member 1027 about its pivotal mounting 1029.

A-shaped member 1027 has portions denoted by 1027a, 1027b, a reinforcing gusset denoted by 1027c and a reinforcing strut denoted by 1027d but it will be appreciated that A-shaped member 1027 merely operates as a pivotal triangular plate, the construction shown being for the purpose of obtaining adequate strength with low weight.

A crank bar denoted by 1030 connects A-shaped member 1027 and longitudinal member 1012 which in turn supports the track. Crank bar 1030 is pivotally attached to portion 1027b of A-shaped member 1027 by means of a pin denoted by 1031, and a pivotal connection is also made with longitudinal bar 1012 through a transverse shaft denoted by 1033, the latter being similarly connected with relation to the opposite side of the vehicle.

It will thus be further apparent that the crank bar 1030 exemplifies a mechanical linkage interconnecting the track or tread assembly and the member 1027 for causing vertical movement of the tread assembly in an opposite direction from that of the ski means, incident to angular movement of the member 1027.

Figure 14:
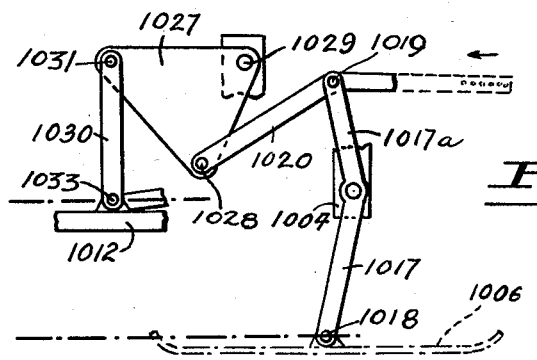
Figure 15:
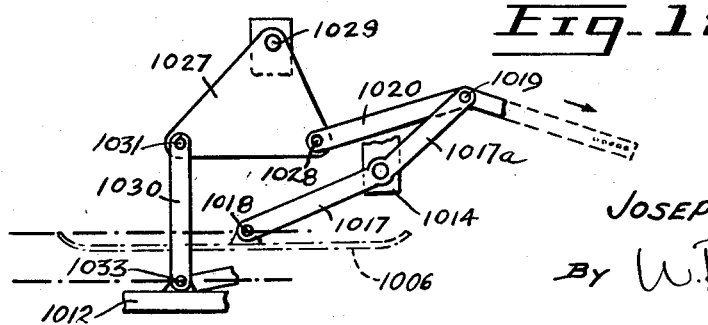

Referring to Figures 14 and 15, the function of the mechanism just described can be readily seen. In Figures 14 and 15, A-shaped member 1027 is shown as a triangular plate, which as mentioned above, is its equivalent, and the right-hand portion of crank bar 1020 is shown in broken lines to indicate that the shock absorbing means plays no real part in the strict mechanical function of the apparatus.

It is apparent with reference to Figures 14 and 15 that when the side skis are extended, the track is in an upward position, and conversely when the track digs in deeply the side skis are raised. It is not necessary to discuss the mechanical function in detail, as it involves only a special application of cranks and levers but is nevertheless considered to be new and inventive. It may be pointed out however, that the operation of the device is completely automatic and by proper proportioning of the size of the components, the proper amount of the raising of the side skis can be provided in relation to the amount which the track digs in.

Without restricting the generality of the mechanism described, it has been found satisfactory if the relative dimensions are as follows:

| Member | Pivot reference | Relative dimension |
|---|---|---|
| Crank 1017 | 1008-1018 | 12.5 |
|  | 1018-1019 | 9.5 |
| Crank bar 1020 | 1019-1028 | 12.375 |
| A-shaped member 1027 | 1028-1029 | 9.0 |
|  | 1029-1031 | 11.0 |
|  | 1031-1028 | 11.0 |
| Crank bar 1030 | 1031-1033 | 11.0 |

I claim:

1. A vehicle, intended for running on snow and the like comprising a chassis, ski means mounted adjacent one end of said chassis, a tread assembly extending from a region just behind said ski means to a region just ahead of the end of said chassis opposite said ski means, said tread assembly being pivotally mounted on said chassis at the region just behind said ski means, a motor means mounted on the forward end of said chassis for driving said tread assembly, a pair of skis mounted for vertical adjustment on said chassis, one adjacent each side of said tread assembly, and an equalizing linkage connecting said skis and said assembly whereby vertical displacement in one direction of the ski pair or of the tread assembly effects a corresponding vertical displacement in the other direction of the other.

2. In a snow vehicle, a chassis, a tread assembly mounted on said chassis for vertical adjustment with respect thereto, a pair of side skis each mounted on cranks pivotally mounted on said chassis, a pair of A-shaped members pivotally mounted on said chassis, crank bar means connecting said tread assembly to said A-shaped members and second crank bar means connecting said cranks to said A-shaped members whereby vertical displacement of said tread assembly causes said side skis to undergo vertical displacement in the opposite sense from said tread assembly, and vice versa.

3. In a snowmobile, a rigid chassis, a tread assembly mounted beneath said chassis and connected thereto for relative vertical movement, ski means mounted on said chassis beside said tread assembly for vertical movement relative to said chassis and to said tread assembly, said tread assembly and said ski means jointly supporting said chassis above the terrain traversed by said snowmobile and linkage means interconnecting said tread assembly and said ski means for relatively opposite vertical movement, said linkage means comprising a member pivotally mounted on said chassis for angular movement in a vertical plane, a first mechanical linkage pivotally connected to said member eccentrically to the pivotal mounting of said member, and interconnecting said member to said ski means for causing vertical movement of the ski means incident to angular movement of the said member, and a second mechanical linkage pivotally connected to said member eccentrically to the pivotal mounting of said member, and interconnecting said member to said tread assembly for causing vertical movement of said assembly in an opposite direction from the vertical movement of the said ski means, incident to the said angular movement of the member.

4. In a snowmobile, a rigid chassis, a tread assembly including an endless track mounted beneath said chassis and connected thereto for relative vertical movement, a driving motor operatively connected with said track, ski means mounted beneath said chassis beside said track and connected to said chassis for relative vertical movement at a location substantially abreast of said connection between the chassis and tread assembly, and linkage means interconnecting said tread assembly and said ski means for relatively opposite vertical movement at the locations of their said connections, said linkage means comprising a member pivotally mounted on said chassis for angular movement in a vertical plane, a first mechanical linkage pivotally connected to said member eccentrically to the pivotal mounting of said member, and interconnecting said member to said ski means for causing vertical movement of the ski means incident to angular movement of the said member, and a second mechanical linkage pivotally connected to said member eccentrically to the pivotal mounting of said member, and interconnecting said member to said tread assembly for causing vertical movement of said assembly in an opposite direction from the vertical movement of the said ski means, incident to the said angular movement of the member.

References Cited in the file of this patent

UNITED STATES PATENTS

| | | |
|---|---|---|
| 1,154,321 | Kinnel | Sept. 21, 1915 |
| 1,661,511 | Steffler | Mar. 6, 1928 |
| 2,171,846 | Davidson | Sept. 5, 1939 |
| 2,284,075 | Tucker et al. | May 26, 1942 |
| 2,312,071 | Broadwater | Feb. 23, 1943 |
| 2,339,886 | Shannon | Jan. 25, 1944 |
| 2,378,111 | Tucker et al. | June 12, 1945 |
| 2,385,758 | Hansen | Sept. 25, 1945 |

FOREIGN PATENTS

| | | |
|---|---|---|
| 282,301 | Germany | Feb. 23, 1915 |